Figure 1:
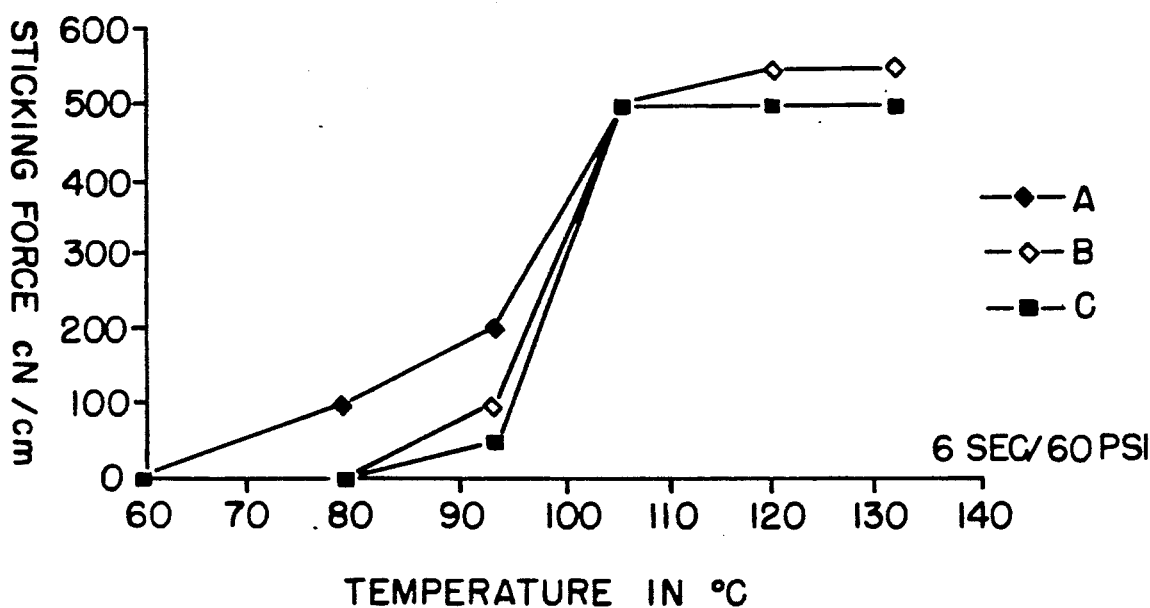

United States Patent [19]

Jottier

[11] Patent Number: 5,145,747
[45] Date of Patent: Sep. 8, 1992

[54] FILM AND POLYMER COMPOSITION FOR FILM

[75] Inventor: Egon Jottier, Mol, Belgium

[73] Assignee: Exxon Chemical Patents Inc., Linden, N.J.

[21] Appl. No.: 478,800

[22] Filed: Feb. 12, 1990

[30] Foreign Application Priority Data

Feb. 13, 1989 [GB] United Kingdom ............... 8903207
Mar. 31, 1989 [GB] United Kingdom ............... 8907300

[51] Int. Cl.⁵ .................................................. B32B 9/04
[52] U.S. Cl. ..................................... 428/484; 428/76; 428/500; 428/515; 428/516; 428/519; 428/521; 428/523
[58] Field of Search ............... 428/484, 500, 515, 516, 428/519, 523, 76, 156, 517, 521; 525/7.1, 43

[56] References Cited

U.S. PATENT DOCUMENTS

| 4,235,657 | 11/1980 | Greenman et al. | 428/484 |
| 4,436,788 | 3/1984 | Cooper | 428/484 |
| 4,518,654 | 5/1985 | Eichbauer et al. | 428/331 |
| 4,848,564 | 7/1989 | Scheller et al. | 428/156 |

FOREIGN PATENT DOCUMENTS

| 100843 | 2/1984 | European Pat. Off. | |
| 6092057 | 7/1981 | Japan | 428/484 |
| 1516420 | 1/1978 | United Kingdom | |

*Primary Examiner*—Paul J. Thibodeau
*Assistant Examiner*—Hoa T. Le
*Attorney, Agent, or Firm*—R. W. Mulcahy

[57] ABSTRACT

A polymer composition, for use in making film to wrap warm rubber bales, includes an ethylene copolymer and a minor proportion by weight of a low molecular weight ethylene-based polymer. The comonomer is preferably vinyl acetate. Lower VICAT softening points can be achieved together with good non-stick characteristics at higher temperatures.

12 Claims, 2 Drawing Sheets

STICKING FORCE

STICKING FORCE OF OLD VERSUS NEW FORMULATION

VICAT SOFTENING POINT OF VARIOUS BLENDS

FILM AND POLYMER COMPOSITION FOR FILM

FIELD OF INVENTION

The invention relates to films and to polymer compositions for extrusion into film for use for example as rubber bale wraps made of such film. The invention relates especially to wrapping film for use in packaging bales of elastomer material for movement from a manufacturing to a location at which the rubber is converted e.g. into tyres. The elastomer material could be EP, EPDM, butyl rubber and any other rubber material as defined by ASTM D-1566.

BACKGROUND OF INVENTION

In the manufacture of rubber such as for example butyl rubber, the butyl rubber product is collected in the form of bales on a packaging line where polyethylene based film is wrapped around the bale, the ends of the polyethylene film are welded together to enclose the bale and form a wrap or bag, and whereafter the bagged bales are boxed, sometimes in five layers on top of each other ready for shipment. The bales to be packaged sometimes are still warm from the manufacturing process and the bales may also be placed in the box in a compressed condition to save space.

On arrival at the manufacturing location the bales are extracted from the box and the bagged bales are then processed e.g. for tyre manufacture. The polyethylene based film thus becomes incorporated into the butyl mix. As a consequence the polyethylene based film used for packaging has to be compatible and meet specified criteria so as to conform to butyl rubber quality control requirements.

The quality control requirements may include the Vicat softening point and speaking generally this should be low i.e. below approximately 82° C. taking into account margins for statistical process control. At the same time the bales are pushed out in a heated condition (up to 70° C.) and output may have to be controlled so as to avoid bale wrapping difficulties. The bales are then put together in the box and should not adhere to one another so that the bales can be fed individually into processing equipment by the customer, the tyre manufacturer after shipment. Thus there is a requirement that the PE film should not stick together and simultaneously that such film should be soft. Compatible bale wrap films have to possess precisely defined physical properties in terms of response to bale wrapping temperatures, sticking and softness.

Known polyethylene based film used for butyl rubber wrapping is a copolymer of ethylene and vinyl acetate containing from 6 to 12% VA. The vinyl acetate derived polymer units reduce the crystallinity and lower the Vicat. However, the amount of vinyl acetate cannot be made too high to reduce the Vicat as this will cause sticking together of the bales in the box. Such known polyethylene based films also incorporate an anti-blocking additive in the form of silica in combination with a slip agent in the form of erucamide to enable higher levels of vinyl acetate without increasing stickiness. Even using the anti-blocking additive, difficulties may be encountered in formulating a film which does not stick together and which at the same time has a low Vicat.

JP-9019068 discloses a mixture of EVA and wax for treating a cable end which EVA has a melt index of greater than 300. This suitable for forming a hot melt extrusion but too high for film formation.

U.S. Pat. No. 4,235,657 discloses a web with two polymer film layers. A separable layer is coated on which contains EVA and an emulsifiable polyethylene wax. The EVA has a high melt index consistent with coating application. There is no requirement for a film forming, heat sealable, non-blocking composition.

Wax has also been used in hot melt adhesive formulations containing as other principal components EVA and a tackifier. The formulations have processing characteristics suitable for hot melt coating etc and are not extrudable into films. The waxes used may be crystalline waxes which are used in this application for rheology control and undesirably reduce adhesiveness.

GB-1516420 uses a low grade polyolefin (having an Mn of 2000 in Example 8) together with a polyolefin resin (such as EVA) and a tackifier to make a tacky film. A grease wax is preferred. The nature of the low grade polyolefin materials is not described. Penetration values are not indicated.

EP-100843 discloses a blend a narrow molecular weight distribution high mol weight polyethylene with a relatively low molecular weight ethylene polymer to give a bimodal distribution. The low molecular weight material has an MI of from 45–300 and an Mn of ~5000, also with a narrow molecular weight distribution (Mw/Mn of from 2 to 4). Such low molecular weight material has a molecular weight which is too high to function in a waxlike manner.

It is the object of the invention to provide an extrudable film forming composition, either as a single layer or as part of a multilayer structure, which does not stick easily to other such films yet which has an acceptable VICAT to facilitate admixture and co-compounding of the film in rubber processing.

The invention has also as its aim to provide a polymer composition which provides a greater processing latitude and provides non-stick characteristics at more elevated temperatures, lower Vicat softening points, and/or higher percentages of vinyl acetate in the polyethylene based polymer for a given Vicat softening point or sticking tendency.

SUMMARY OF INVENTION

In a wide aspect of the invention there is provided a film comprising, in one or more layers,
  (a) a major proportion of a film forming polymer of ethylene and at least one commonomer, said polymer having a melt index of from 0.1 to 10; and
  (b) up to 30 wt % of the film of a natural or synthetic wax having a drop melting point of from 80° to 150° C., a penetration value up to 5.0 dmms and an Mn of from 500 to 5000, preferably up to 3000.

Such films can provide sufficient sealability at sealing temperature but inhibit sticking whilst providing a relatively low VICAT.

Various values given in the text and claims are determined as follows:
Melt index (MI): ASTM D 1238 Condition E 190° C., 2.16 kg mass; expressed in g/10 min.
Drop melting points: ASTM D 3954 in °C.
Penetration Value: Needle penetration 100 g, 5 seconds at 25° C. in dmm. ASTM—1321-86
Mn: Number average molecular weight by GPC using a styrene standard
VICAT softening point: ASTM—1525

Sticking force: The sticking force in all cases was measured as follows: 15 mm wide film strips are pressed together at one end on a Sentinel sealer. The dwell pressure and dwelltime are varied over a certain range to find the conditions at which substantially no sticking occurs at the wrapping temperature which prevails on the packaging line. In this case 70° C. was used as 60 psi (4.14 bar) and 6 seconds dwelltime. Then the strips are conditioned for at least 24 hrs in standard conditions (23° C., relative humidity 50%). The sticking force is then measured by pulling the strips apart at a 180° C. angle in a tensile tester.

Viscosity: expressed in mPa second at a temperature of 140° C.

Suitably the comonomer for the film forming polymer is an esterified ethylenically unsaturated comonomer such as vinyl acetate (VA), methyl acrylate (MA), butyl acrylate (BA). The comonomer for the film forming polymer may also be propylene and optionally a diene such as EP or EPDM.

The wax is a low molecular weight material. The wax is preferably sufficiently compatible, and homogeneously blended in the composition and tends not to migrate unduly to the surface in the blend. Suitably the esterified comonomer is vinyl acetate and contains at least from 0.5 to 40 wt. % of vinyl acetate preferably from 5 to 30 wt %. If the penetration value is too high and the wax is too soft and/or lacks crystallinity, unsatisfactory blocking effects may be obtained. The penetration value is generally above 0.5 dmm.

If the molecular weight is too high, the VICAT may not be kept relatively low. If the molecular weight is too low processability and compatibility may be reduced.

The film may be made either as a single ply, homogeneous film or a multi-ply coextruded film with the wax component predominantly in a surface layer. Overall the wax content should be low, but where coextrusion is used the wax content in the surface layer can be high without unduly affecting the overall co-compounding characteristic of the film in rubber processing.

Thus in a first more narrow aspect the film has a single layer and contains from 2 to 20 wt % of the wax, preferably at least 5 wt %. The homogeneous single layer film may conveniently be blow-extruded. In such a case it is expecially preferred to have a level of vinyl acetate towards the lower end of the aforementioned broad range with a content of from 6 to 12 wt. %. In such a case it is preferred to use an amount of wax of less than 15 wt. %.

In a second narrow aspect the film has an inner layer of the polymer substantially without wax and coextruded therewith a second layer containing the polymer and from 10 to 50 wt % of the wax, preferably from 15 to 25 wt %.

When the film is made in coextruded form the layer substantially devoid of wax can be formulated for other film requirements such as mechanical strength and sealability and the layer with wax may have a relatively high wax described so as to optimize the anti-sticking effect.

Using this invention components are selected so as to combine a sticking force of less than 50 CN/cm at 80° C. and a VICAT softening point of less than 82° C.

The invention also relates to compositions suitable for producing the above film as a whole or a coextruded wax containing seal layer for a composite film.

By permitting sticking to be reduced whilst lowering the Vicat, the quality control requirements in the manufacture of the film can be relaxed so enabling the film to be made more cheaply. Packaging speeds can be increased because the bales need not be cooled to the same extent prior to packaging and boxing. The bales can be compressed when boxed to a considerable degree without leading to sticking. The characteristics of a film made from a composition according to the invention may also be exploited in other applications where a combination of low sticking temperature and low Vicat are required.

The wax is preferably a high density one which may contain functional groups such as carbonyl groups derived from a transfer agent but having low branchiness. The wax may suitably have a density of from 0.92 to 0.99 and has a viscosity of from 20 to 10000 mPa's preferably less than 5000. Higher wax stiffness and molecular weight helps to inhibit sticking. The wax may be a low viscosity wax such as Escomer H101 as supplied by Exxon Chemical Belgium.

The composition may optionally contain slip and/or anti-block additives as for known films. A combination of these additives gives a low coefficient of friction which aids the processability of the bags in the packaging equipment.

Using the invention considerably less sticking can be achieved without an increase in the Vicat softening temperature or alternatively at similar sticking characteristics a lower Vicat softening temperature can be obtained or higher bale wrapping temperatures can be used for greater line efficiency. The film was sufficiently transparent to allow visual inspection of bale contents. The waxes can be compounded with rubber in manufacture.

EXAMPLES

EXAMPLE 1

Polymer Composition

A conventional polymer composition was prepared by blending ethylene vinyl acetate having a melt index of 2.5±0.2 grams/10 min and containing 8.0±0.5 wt. % of vinyl acetate derived units. 850 ppm±75 of slip additive (erucamide) was added as well as 8000 ppm±1000 of anti-block additive in the form of silica. The resultant homogeneous blend is referred to as blend A.

Further blends according to the invention were prepared by using the same formulation as indicated previously but replacing 15 wt. % respectively 25 wt. % of the ethylene vinyl acetate copolymer by Escomer (Registered Trade Mark) H101 polyethylene wax. These blends are referred to as blend B and blend C.

The film

Blend A, blend B and blend C were blown extruded into films having a thickness of 50 micron. Blend C was also coextruded onto blend A with the layer of blend A 40 micron thick and the wax containing layer of blend C 10 microns thick to produce four films. The film should preferably be made by blown film extrusion process which allows a lower cooling rate relative to cast film processes. Quench cooling in cast processes should preferably be avoided to restrict stickiness.

FIG. 1 shows the sticking force in CN/cm at different temperatures of the blown extruded films. It can be seen that the film of blend A suffers from an increasing stickiness starting at 60° centigrade whereas the stickiness of films of blown extruded blends B and C only increase stickiness starting from 80° C.

Figure 2:
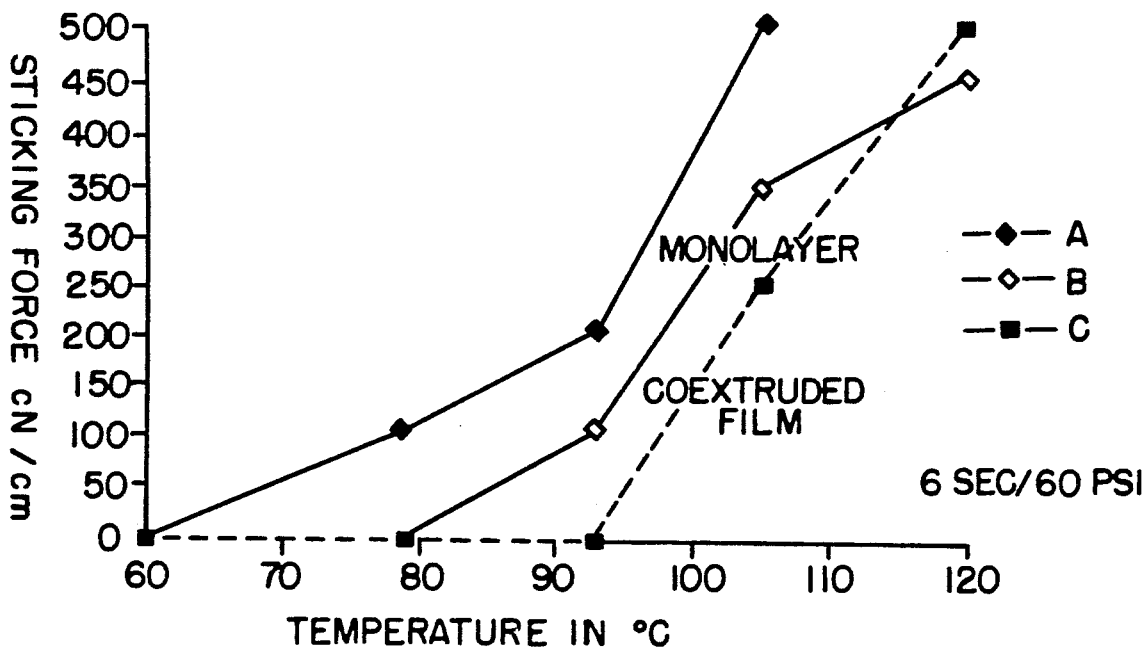

With reference to FIG. 2, the coextruded film has a sticking force measured on its outside wax containing side which does not increase until a temperature in excess of 90° C. is reached and performs better than the blown extruded film made of blend B.

Figure 3:
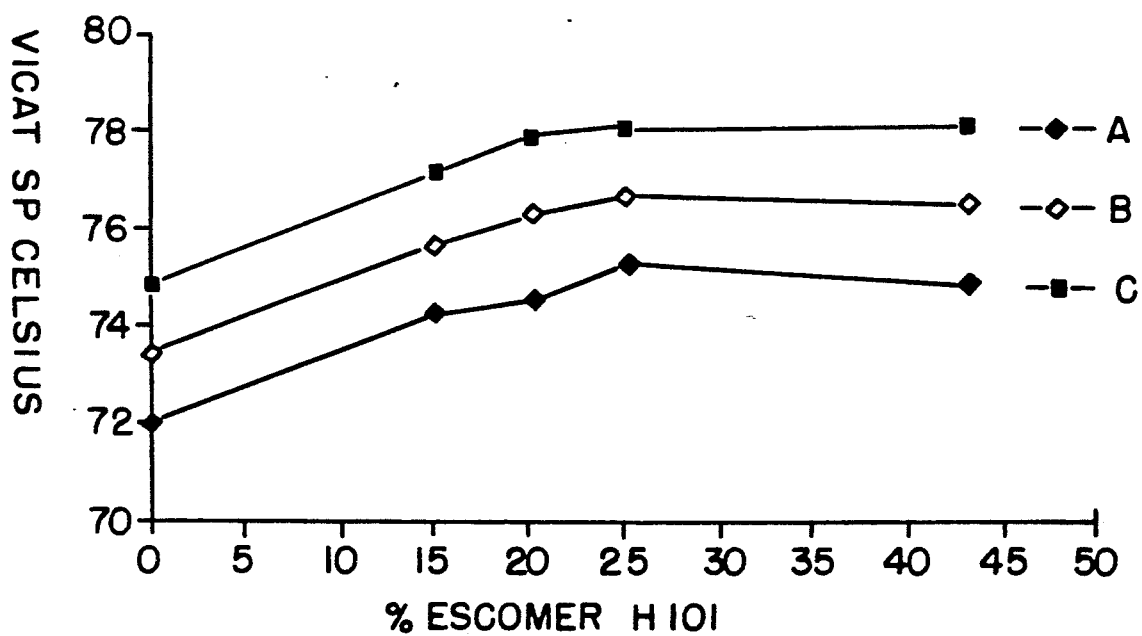

The Vicat softening point of various blends is shown in FIG. 3 including the wt. % of H101 wax used for blends B and C. It can be seen that there is a small increase in Vicat softening point at small proportions of wax added but that the Vicat softening point remains low in a wide range of compositions. For the coextruded structure the change in Vicat is so small that it is not detectable by the conventional method of ASTM-1525.

It is clear from the Example that the effect in delaying onset of stickiness is much greater than the effect of the same amount of wax in increasing Vicat so that surprisingly a greater range of films can be prepared having characteristics meeting existing quality control specifications. In coextrusions a thin layer of film of a composition of the invention on a base layer has a very small, barely detectable effect on the overall properties.

The adhesive properties of the film can be modified to adapt the film further without changing VICAT by embossing but films of the composition of the invention may be used without embossing.

I claim:

1. A film having at least two layers, a first layer being a polymer composition comprising a mixture of:
   a) a film-forming polymer of ethylene and up to about 40 wt % of a comonomer selected from the group consisting of vinyl acetate, methyl acrylate and butyl acrylate, said polymer having a melt index of from 0.1 to 10 and
   b) from about 2 to 50% by weight of a crystalline wax having a drop melting point of from about 80 to 150° C., a penetration value up to 5.0 dmms and a number average molecular weight of from 500 to 5000;
   and a second layer substantially devoid of wax adhered to said first layer, said second layer being a film-forming polymer composition as defined by (a).

2. The film of claim 1 wherein said comonomer is vinyl acetate present at a level of from 5 to 30 wt %.

3. The film of claim 1 wherein said wax is present at a level of up to 30 wt % based on the weight of said first layer.

4. The film of claim 1 wherein said wax is an ethylene-based polymer.

5. The film of claim 1 wherein the wax has a density of from 0.92 to 0.99 and a viscosity of from 20 to 10,000 mPa's.

6. The film of claim 5 wherein said wax has a viscosity of less than 5,000 mPa's.

7. The film of claim 1 wherein said wax contains polar groups.

8. A film according to claim 1 substantially free of a tackifying resin.

9. A film according claim 1 consisting essentially of the polymer and the wax.

10. A film of claim 1 wherein the film has a sticking force of less than 50 CN/Cm at 80° C. and a Vicat softening point of less than 82° C.

11. The film of claim 3 wherein said wax is present at a level within the range of 15 to 25 wt. % based on the weight of said first layer.

12. The composition of claim 1 wherein said crystalline wax is polyethylene.

* * * * *